United States Patent Office
3,170,796
Patented Feb. 23, 1965

3,170,796
PACKAGED CULINARY MIX FOR PREPARING RICH BAKED GOODS
Arlee A. Andre, Springfield Township, Hamilton County, and Herbert B. Sweringen, Green Township, Hamilton County, Ohio, assignors to The Procter & Gamble Company, Cincinnati, Ohio, a corporation of Ohio
No Drawing. Filed July 17, 1962, Ser. No. 210,583
2 Claims. (Cl. 99—94)

This is a continuation-in-part of co-pending application, Serial No. 171,271, now abandoned, filed February 5, 1962.

This invention relates to prepared culinary mixes. More particularly, it relates to shortening-containing culinary mixes which contain a fluid shortening packaged as a discrete unit which is to be combined with other ingredients of the mix to form a baked product having superior properties.

The use of prepared mixes has greatly simplified the task of the housewife in the preparation of culinary mixes of the type containing sugar, flour, shortening, and other minor ingredients. To preparate them for use a housewife customarily adds aqueous ingredients such as water, milk, or eggs to the mix and stirs the mixture to form a homogeneous batter. This is subsequently baked to produce the final product. The use of such mixes avoids the problem of assembling the various ingredients and measuring the desired quantities.

Prepared mixes of this type customarily are made by combining all of the ingredients, including sugar, flour, and shortening. In order to obtain a uniform mixture, a very long mixing time is required, particularly in regard to achieving a thorough dispersion of the shortening in the mix.

When it is desired to make a rich cake, which contains levels of shortening of about 12% or more, it is difficult to incorporate the shortening in the mix and still retain the form of the mix as free-flowing particles. When the shortening level is above about 16% this problem becomes very acute. The shortening causes the individual particles of dry ingredients to stick together and form lumps. A very large amount of shortening may cause the mixture to form a creamy mass resembling soft fudge.

It has been proposed that clear oils be added to a cake mix by the housewife at the time of making a cake batter in order to supply the additional fatty materials necessary to produce a rich cake product. When the housewife prepares a batter from the mix, she measures out a predetermined amount of the oil and adds it to the mix along with other liquid ingredients which may added.

It has now been found, however, that if surface active emulsifiers are present in the oil, a superior cake can be baked as compared to a product wherein the emulsifiers are incorporated in the dry mix and only oil is added to the prepared mix. Desirably the oil and emulsifier combination is packaged as a discrete unit. The contents of the package are conveniently available in pre-measured form for addition to the mix at the same time the aqueous materials are added to prepare a batter.

Although it is not intended that the invention is to be limited by any theory, it is believed that the addition of the oil and emulsifier substantially concurrently with the addition of aqueous material to the mix with stirring permits better air incorporation in the batter and also more uniform dispersion of the shortening, but with a relative ease of mixing.

Accordingly, it is an object of this invention to provide a packaged culinary mix containing a high level of shortening.

A further object is to provide packaged culinary mixes which can be made into baked goods which are more tender, have better eating qualities, and better crust appearance than products made from conventional mixes.

Other objects and advantageous features will be apparent from the following detailed description.

In general, pre-packaged culinary mixes of this invention comprise a discrete unit of dry ingredients, including sugar and flour, and a discrete unit of fluid shortening. The discrete fluid shortening contains at least 0.01%, by weight, of surface-active emulsifier and comprises at least 1.0% of the total culinary mix. The total amount of shortening in the mix is from about 6% to 26%. The dry unit of ingredients can contain a part of the shortening, at a level of from about 0% to 16%, by weight of the total culinary mix.

When a batter is to be made by the housewife, aqueous material and the discrete unit of fluid shortening are added to the dry mix in substantially concurrent order, the resulting mixture is stirred to incorporate air therein, and the aerated batter is baked.

Dry mixes suitable for the practice of this invention contain flour and sugar. Additional ingredients such as milk solids, hydrophilic colloids, leavening, and flavoring are desirably added to provide the type of product desired.

For example, a general range of ingredients for cake mixes will be as follows:

| | |
|---|---|
| Flour | 20%–50%. |
| Sugar | 20%–70%. |
| Shortening, including emulsifier | 6%–26%. |
| Milk solids | 0%–5%. |
| Leavening | 0.5%–4%. |
| Hydrophilic colloids | 0%–1%. |
| Cocoa | 0%–10%. |
| Flavor | Minor amounts. |
| Color | Minor amounts. |

Although the term "cake mix" has been used to define the invention, it is to be understood that such term is intended to define related products of the same general composition such as cookies and brownies.

Shortenings suitable for addition to the mix as a discrete unit are desirably fluid so that they may be added with a minimum of inconvenience. At least a major part of such shortening is liquid oil. Surface active emulsifier can be either dissolved in the oil or suspended in it in the form of normally solid material. If the surface active emulsifier is itself an oil, it may comprise up to the whole amount of the discrete unit of shortening. Additional non-surface active fats such as saturated triglyceride can also be present.

The oil portion of the shortening can be derived from naturally occurring liquid glyceride oils such as cottonseed oil, soybean oil, peanut oil, rapeseed oil, sesame seed oil and sunflower seed oil. Also suitable are liquid oil fractions obtained from palm oil, lard and tallow, as, for example, by graining or directed interesterification, followed by separation of the oil. Oils predominating in glycerides of unsaturated acids may require some hydrogenation to maintain flavor, but care should be taken not to hydrogenate the fat or otherwise process it so that it becomes plastic.

Other suitable oils include certain di- or triglycerides in which one or two of the —OH groups of the glycerine have been replaced by acetic, propionic, butyric or caproic radicals, and one or two of the remaining —OH group of the glycerine have been replaced by acyl radicals of higher molecular weight saturated or unsaturated fatty acids having from 12 to 22 carbon atoms. These glycerides, containing both high and low molecular weight acid radicals, hereinafter will be referred to as low molecular synthetic fats. The low molecular synthetic fats should be fluid at 60° F.

Of course mixtures of the above oils or other oils can also be used in the culinary mixes of this invention.

A wide variety of surface active emulsifiers can be used in the practice of this invention. Partially esterified polyhydric compounds having surface active properties are exceptionally suitable. This class of emulsifiers includes, among others, mono- and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Other examples include the partial esters of hydroxy carboxylic acids, such as lactic, citric, and tartaric acids with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

The fluid shortening can also contain normally solid fatty materials such as saturated triglyceride fat. However, the amount of solid fatty material must not be so great that the shortening becomes plastic.

A particularly suitable shortening is described in U.S. Patent 2,815,286, Andre and Going. Shortenings of this type comprise a liquid oil containing from about 2% to 10% normally solid fatty glycerides. The solid fatty glycerides can include fatty monoglycerides and diglycerides of saturated fatty acids having from 16 to 22 carbon atoms. At least about 80% of the fatty glycerides should be in a beta phase.

Suitable fluid shortenings can be made according to the teachings of U.S. Patent 2,815,285, Holman and Sanders. By the process of this patent a mixture of normally solid and normally liquid fatty glycerides, comprising about 1% to 20% normally solid glycerides, based on the weight of the mixture, is melted and then rapidly cooled. Crystallization and subsequent heating conditions are adjusted so that at least about 60% of the glycerides are in a beta phase.

Other ingredients for mixes of this invention can be of conventional type and quality. Thus, the flour may be the usual bleached cake flour, although a good general purpose flour can be substituted, especially if appropriate emulsifiers are provided. The ordinary granulated sugars are quite satisfactory, including sucrose, dextrose, maltose, fructose, lactose, and brown and invert sugars, alone or in combination. The ratio of sugar to flour may be adjusted as necessary for special circumstances, but a ratio of sugar to flour in excess of 1:1 has long been known to result in particularly good cake mixes.

The selection of a chemical leavening system from among those known in the art will pose no problem for one skilled in the formulation of culinary mixes. In general, such systems are composed of a baking soda, e.g. sodium, potassium, or ammonium bicarbonate, on the one hand, and one or more phosphate or other common baking acids on the other. Suitable baking acids include monocalcium phosphate, dicalcium phosphate, sodium acid pyrophosphate, potassium acid tartrate, monosodium phosphate, sodium aluminum phosphate, and sodium aluminum sulfate, among others.

For many mixes it is accepted practice for the housewife to add the required amount of eggs in the course of batter preparation and this practice may be followed just as well in the present mixes. If desired, however, the inclusion of egg solids in the mix is an allowable alternative.

Suitable hydrophilic colloids can include natural gum materials such as gum tragacanth, locust beam gum, algin, gelatin, Irish moss, pectin, and gum arabic. Synthetic gums such as water-soluble salts of carboxymethyl cellulose can also be used.

Shortening also can be present in the dry mix, either in a fluid form as heretofore described, or in plastic form. Surface active emulsifier can also be present in the dry mix. However, the total shortening in the dry mix should not exceed about 16% by weight, since the use of greater amounts will cause the individual mix particles to stick together and form lumps.

The function of, and permissible variations in, the remaining ingredients is sufficiently obvious to render a detailed explanation thereof unnecessary.

The exact method of compounding the dry mix is not critical, although very satisfactory results are obtained by mixing in a ribbon blender. The flour, sugar, and a part of the shortening, if it is to be included in the dry mix, are blended into a homogeneous premix. This premix may be passed through some sort of impact grinder to eliminate lumps. Additional ingredients can then be added and the whole again mixed. An additional step of impact grinding may be desirable to remove any lumps present in the final dry mix.

Another method of preparing a dry mix in which some shortening is present is by the methods disclosed in U.S. Patents 2,874,051, 2,874,052, and 2,874,053, in which a homogeneous blend is formed containing sugar, flour and shortening, and this blend is then subjected to simultaneous shearing and crushing forces.

The discrete unit of fluid shortening must be packaged in a container which will prevent any leakage of oil into the dry mix. Except for this consideration, the exact form of composition of the container is not critical. It may be desirable to provide a transparent flexible packet, such as one made from a film combining polyethylene, polyvinylidine chloride, and copolymer of ethylene glycol and terephthalic acid.

The dry mix and the packet of fluid shortening are enclosed in an outside wrapping, preferably in the form of a rigid container, but maintained as discrete units within the wrapping.

The invention will be shown with greater particularity by the following examples:

*Example 1*

A basic dry cake mix was prepared containing the following ingredients thoroughly mixed together.

| Ingredient: | Parts by weight |
|---|---|
| Sugar (6X) | 51.42 |
| Cake flour | 32.18 |
| Shortening [1] | 7.76 |
| Salt | 0.53 |
| Sodium bicarbonate | 0.95 |
| Sodium aluminum phosphate | 0.25 |
| Potato flour | 0.25 |
| Flavor | 0.04 |
| Cocoa | 6.62 |

[1] This was a plastic triglyceride fat consisting of a mixture of directed rearranged lard and partially hydrogenated soybean oil, and additionally containing 18%, by weight, of glyceryl lactostearate emulsifier.

A. A batter was prepared by combining 600 gm. of the mix, 300 gm. of water, 2 eggs; and 57 gm. of a discrete unit of shortening consisting of soybean oil hydrogenated to an iodine value of about 110, and containing suspended therein 4.8% of propylene glycol monostearate, 3.2% partial ester of glycerine with soybean oil hydrogenated to an I.V. of 8, 2% of soybean oil hydrogenated to an I.V. of 8, and 1.3% of stearic acid. The batter was mixed for 1 minute at medium speed on a Hobart mixer, and then portions of the batter were baked at 350° and 375° F. The center and edge heights of the baked cakes were measured, and the top crust was examined.

B. A batter was prepared as in A, except that the shortening in the dry mix contained additionally the propylene glycol monostearate, the partial ester of glycerine, the stearic acid, and one-half of the hydrogenated soybean oil (I.V. 8), which were present in the discrete unit of shortening of Example A. The discrete unit of shortening added to the dry mix for this example consisted of about 49 g. of soybean oil hydrogenated to an iodine value of about 110 and 1 g. of soybean oil hydrogenated to an I.V. of 8. Cakes were baked as in A.

C. A batter was prepared as in B, except that the discrete unit of shortening consisted only of 50 g. of refined and bleached cottonseed oil. Cakes were baked as in A.

| Cak | Height (Inches) | | Crust |
|---|---|---|---|
| | Center | Edge | |
| A, °F.: | | | |
| 350 | 2.21 | 1.95 | Smooth even color. |
| 375 | 2.30 | 1.88 | |
| B, °F.: | | | |
| 350 | 2.20 | 1.86 | |
| 375 | 2.29 | 1.81 | Wrinkled and lifted easily; also contained a dark ring on top. |
| C, °F.: | | | |
| 350 | 2.08 | 1.85 | |
| 375 | 2.27 | 1.85 | |

As can be seen by the above data, the batter of Cake A, in which surface active emulsifier was present in the discrete unit of shortening, produced a cake which was larger in volume than Cakes B and C, and also possessed a much superior crust.

Comparable baking results will be achieved if the discrete units of shortening and the dry mixes are placed in separate packages and stored for a period of two months prior to baking.

*Example 2*

A dry mix was made having the following composition.

Ingredient: Percent by weight
- Sugar, industrial fine _____ 45.89
- Cake flour _____ 39.00
- Potato flour _____ 0.20
- Shortening[1] _____ 11.00
- Dry milk solids _____ 0.25
- Salt _____ 0.50
- Sodium bicarbonate _____ 1.30
- Sodium aluminum pyrophosphate _____ 0.36
- Sodium carboxymethyl cellulose _____ 0.30
- Flavor _____ 1.20

[1] The shortening was a mixture of vegetable oil and directly rearranged lard, hydrogenated to an I.V. of about 55, and additionally including 5% of vegetable triglyceride hardened to an I.V. of 8.

20 oz. of this mix was placed in a polyethylene bag. 1½ oz. of a fluid shortening was placed in a flexible packet, whose walls were a film combining polyethylene, polyvinylidine chloride, and copolymer of ethylene glycol and terephthalic acid. The shortening comprised soybean oil hydrogenated to an I.V. of 107 and contained about 2% soybean oil hydrogenated to an I.V. of 8, 4.8% of propylene glycol monostearate, 3.2% of superglycerinated hydrogenated soybean oil, and 1.3% stearic acid.

Both of these discrete units were placed in a cardboard container and stored for 4 weeks at a temperature of 100° F. and a relative humidity of 70%.

A batter was then made by combining the two discrete units of the mix with 3 gms. of water and 3 eggs. The batter was baked for 30 minutes at 350° F. and an excellent cake resulted.

*Example 3*

A dry mix was prepared having the following composition.

Ingredient: Parts by weight
- All-purpose flour _____ 22.50
- Granulated sugar _____ 25.00
- Powdered sugar _____ 24.50
- Cocoa _____ 7.00
- Salt _____ 0.70
- Vanilla flavor _____ 0.30
- Shortening[1] _____ 6.00

[1] A commercially available plastic triglyceride vegetable shortening sold under the trade name "Crisco."

The shortening and granulated sugar were creamed together in a Hobart mixer and then the remainder of the ingredients were added and mixed to form a dry mix.

454 gms. of the dry mix were placed in a bowl. To it was added 64 gms. of a fluid shortening which consisted of soybean oil hydrogenated to an iodine value of about 110 and having suspended therein about 1.4% monoglyceride, 1.4% diglyceride and 4.2% triglyceride made by superglycerinating hydrogenated soybean oil. The amount of the shortening was equal to 14%, by weight, of the total amount of mix and shortening. Also added were 2 eggs, 30 cc. of water, vanilla, and ½ cup of nuts. After about 75 strokes by hand, a smooth batter was formed and this was baked in a square pan for 30 minutes at 350° F. An excellent brownie was produced. It has been found that the addition of all of the shortening to an initial dry mix prior to making the batter would produce a wet sticky mass resembling unset fudge.

Comparable results will be noted with other brownie mixes having compositions varying within the ranges heretofore set forth.

What is claimed is:

1. A packaged culinary mix for preparing rich baked goods containing above about 16% by weight shortening consisting essentially of:
   (a) a discrete unit of free-flowing dry ingredients which do not stick together and form lumps comprising sugar, flour and shortening, said shortening not exceeding about 16% by weight of the dry ingredients; and
   (b) a discrete unit of fluid shortening containing at least 0.01% by weight of said fluid shortening of a surface active emulsifier, and said discrete unit of fluid shortening comprising at least 1.0% by weight of the total culinary mix such that the total amount of shortening in the mix does not exceed about 26% by weight of the total culinary mix.

2. A packaged culinary mix according to claim 1 wherein the discrete unit of free-flowing dry ingredients contains about 10% cocoa.

References Cited by the Examiner

UNITED STATES PATENTS

| 1,170,474 | 2/16 | Beatty. | |
| 2,815,285 | 12/57 | Holman et al. | |
| 2,815,286 | 12/57 | Andre et al. | |
| 2,864,705 | 12/58 | Schulman. | |
| 2,916,379 | 12/59 | Finucane | 99—94 X |
| 2,918,377 | 12/59 | Hurley et al. | 99—172 X |
| 2,939,792 | 6/60 | Kline et al. | 99—94 |
| 3,011,896 | 12/61 | Eber et al. | 99—118 |
| 3,015,429 | 1/62 | Morici. | |
| 3,078,168 | 2/63 | Bedenk | 99—94 |
| 3,096,179 | 7/63 | Finucane et al. | 99—94 |

OTHER REFERENCES

"The Journal of the American Oil Chemists' Society," January 1958, page 28.

A. LOUIS MONACELL, *Primary Examiner.*

ABRAHAM H. WINKELSTEIN, RAYMOND N. JONES, *Examiners.*

Disclaimer 3,170,796.—*Arlee A. Andre*, Springfield Township, Hamilton County, and *Herbert B. Sweringen*, Green Township, Hamilton County, Ohio. PACKAGED CULINARY MIX FOR PREPARING RICH BAKED GOODS. Patent dated Feb. 23, 1965. Disclaimer filed Dec. 3, 1979, by the assignee, *The Procter & Gamble Company*.

Hereby enters this disclaimer to claims 1 and 2 of said patent.

[*Official Gazette, April 8, 1980.*]